US008139275B2

(12) United States Patent
Watanabe

(10) Patent No.: US 8,139,275 B2
(45) Date of Patent: Mar. 20, 2012

(54) OUTPUT DATA CREATING DEVICE FOR CREATING COLOR CONVERSION INTERPOLATION TABLES AND OUTPUT DATA CREATING PROGRAM FOR CREATING COLOR CONVERSION INTERPOLATION TABLES

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 196 days.

(21) Appl. No.: 11/392,807

(22) Filed: Mar. 30, 2006

(65) Prior Publication Data

US 2006/0221365 A1    Oct. 5, 2006

(30) Foreign Application Priority Data

Mar. 31, 2005    (JP) .................................. 2005-100394

(51) Int. Cl.
*H04N 1/46*    (2006.01)

(52) U.S. Cl. ........ 358/525; 358/1.9; 358/3.24; 358/518; 382/167

(58) Field of Classification Search ................. 358/518, 358/1.14, 1.9, 3.24; 345/593; 396/429; 382/166
See application file for complete search history.

(56) References Cited

U.S. PATENT DOCUMENTS

| | | | | |
|---|---|---|---|---|
| 5,736,989 A | * | 4/1998 | Lhotak | 345/593 |
| 5,786,908 A | * | 7/1998 | Liang | 358/518 |
| 6,697,520 B1 | * | 2/2004 | Hemingway | 382/166 |
| 6,825,958 B1 | * | 11/2004 | Fukasawa et al. | 358/518 |
| 7,151,612 B2 | * | 12/2006 | Mikami | 358/1.14 |
| 7,286,262 B2 | * | 10/2007 | Hanyu | 358/1.9 |
| 7,969,478 B1 | * | 6/2011 | Chen et al. | 348/223.1 |
| 2002/0048056 A1 | * | 4/2002 | Kubo | 358/518 |
| 2002/0110376 A1 | * | 8/2002 | MacLean et al. | 396/429 |
| 2004/0051892 A1 | * | 3/2004 | Hemingway | 358/1.9 |
| 2005/0063016 A1 | * | 3/2005 | Takahashi et al. | 358/3.24 |
| 2005/0201617 A1 | * | 9/2005 | Park et al. | 358/518 |

FOREIGN PATENT DOCUMENTS

| | | | |
|---|---|---|---|
| JP | 2001128018 A | * | 5/2001 |
| JP | A 2001-128018 | | 5/2001 |
| JP | A-2004-064666 | | 2/2004 |
| JP | A-2005-041009 | | 2/2005 |

* cited by examiner

*Primary Examiner* — Twyler Haskins
*Assistant Examiner* — Nicholas Pachol
(74) *Attorney, Agent, or Firm* — Oliff & Berridge, PLC

(57) ABSTRACT

An output data creating device creates output data to be used by an image formation device based on input data representing image to be formed. The data creating device includes an output condition obtaining unit that obtains output condition regarding image formation on the recording medium, a table storage unit that stores a plurality of color conversion tables meeting a plurality of predetermined conditions used for converting the input data to the output data, a combined color converting unit that converts the input data based on the output condition and a plurality of color conversion tables stored in the table storage unit when there is not a color conversion table that meets the output condition obtained by the output condition obtaining unit in the table storage unit, and an output data creating unit that creates the output data based on the input data that has been color-converted.

16 Claims, 7 Drawing Sheets

OUTPUT DATA CREATING DEVICE FOR CREATING COLOR CONVERSION INTERPOLATION TABLES AND OUTPUT DATA CREATING PROGRAM FOR CREATING COLOR CONVERSION INTERPOLATION TABLES

CROSS-REFERENCE TO RELATED APPLICATION

This application claims priority from Japanese Patent Application No. 2005-100394, filed on Mar. 31, 2005, the entire subject matter of the application is incorporated herein by reference.

BACKGROUND

1. Technical Field

Aspects of the invention relate to an output data creating device that creates output data to be used by an image forming device (e.g., a printer, a display and the like) and an output data creating program which controls a computer or the like to create such output data.

2. Description of Related Art

Conventionally, when the output data to be used by image formation devices such as a printer, a display and the like is created, it is general that a color conversion of input data representing an image to be formed is performed using a color conversion table. For example, when print data for a color printer, the color conversion of the image data is executed using, for example, the ICC color profile, and then based on the color-converted data, the print data is created. In an inkjet printer, based on the print data, C (Cyan), M (Magenta), Y (Yellow) and K (Black) inks are ejected to form respective color components. By overlaying these color components, a color image is formed (printed) on the recording medium.

In a conventional print data creating device, a plurality of color conversion tables have been prepared corresponding to print conditions such as resolutions, total ink amount restricting value and a type of the recording medium (material and color), environmental conditions such as the temperature and humidity, and a combination of the printing conditions and environmental conditions (which will be referred to as output conditions, hereinafter). Then, depending on the output condition set by the user, a corresponding to color conversion table is used so that the optimum color conversion can be applied to the image data.

Optionally, there is known a compensation table corresponding to the printing condition (e.g., the type of ink, the type of the recording sheet, etc.) of the color image is used to compensate for the color conversion table. An example of such a technique is disclosed in Japanese Patent Provisional Publication No. P2001-128018A (hereinafter, referred to as '018 publication). According to this publication, the print data corresponding to the printing condition can be obtained quickly. Therefore, a color image can be printed quickly at high quality. Such a configuration is advantageous since data storage capacity can be reduced in comparison with a case where the color conversion tables are prepared corresponding to all the printing conditions.

According to the conventional art described above, a plurality of color conversion tables should be prepared corresponding to all the output conditions. Accordingly, the more the conditions are, the more the color conversion tables should be prepared. Therefore, in practice, when the image data is color-converted, if the output condition set by the user is within a predetermined range, the color conversion table corresponding to the condition closest to the output condition is used. Therefore, if the color conversion table corresponding to the output condition set by the user does not exist, the optimum color-conversion corresponding to the output conditions cannot be performed. Thus, it is very difficult to create the print data accurately reflecting the output condition.

Further, according to the '018 publication, it is necessary to create a plurality of compensation tables corresponding to the printing conditions in advance. Therefore, if the number the print condition is relatively large, it is troublesome to prepare such compensation tables. Further, when the number of the print conditions is relatively large, the number of compensation tables is also relatively large, and therefore, it is impossible to reduce the storage capacity. Further, if there is no compensation table corresponding to the printing condition, similar to the conventional technique, it is impossible to execute the optimum color conversion corresponding to the printing conditions.

SUMMARY OF THE INVENTION

Aspects of the invention provide an improved output data creating device and output data creating program with which the output data accurately reflecting the output condition based on the input data can be created without increasing the required storage capacity.

BRIEF DESCRIPTION OF THE ACCOMPANYING DRAWINGS

FIG. 1 is a block diagram showing an electrical configuration of a printing system according to aspects of the invention.

FIG. 2 schematically shows a structure of storage areas of a RAM (Random Access Memory).

FIG. 3 schematically shows a structure of storage areas of an HDD (Hard Disk Drive).

DETAILED DESCRIPTION

General Overview

Figure 1:
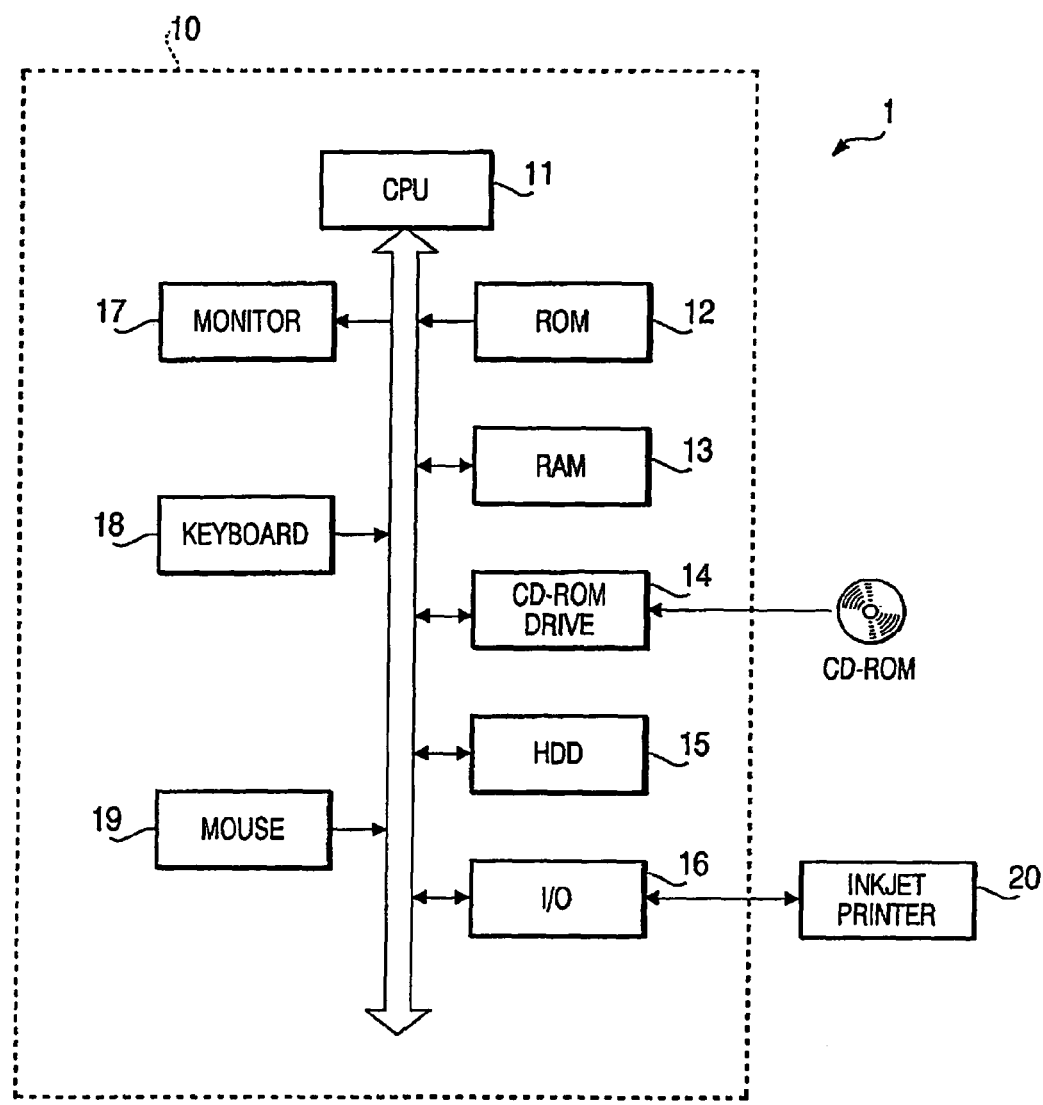

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided an output data creating device that creates output data to be used by an image formation device that forms an image on a recording medium based on input data representing image to be formed by the image formation device. The data creating device is provided with an output condition obtaining unit configured to obtain output condition regarding image formation on the recording medium by the image formation device, a table storage unit configured to store a plurality of color conversion tables meeting a plurality of predetermined conditions used for converting the input data to the output data, a combined color converting unit configured to convert the input data based on the output condition and a plurality of color conversion tables stored in the table storage unit when there is not a color conversion table that meets the output condition obtained by the output condition obtaining unit in the table storage unit, and an output data creating unit that creates the output data based on the input data having been color-converted by the combined color converting unit.

The combined color converting unit may create an interpolating table that meets the output condition obtained by the output condition obtaining unit by interpolation based on the plurality of color conversion tables stored in the table storage unit.

The combined color converting unit may be configured to convert the input data into a plurality of pieces of intermediate data based on the plurality of color conversion tables stored in the table storage unit, and create the output data by applying the interpolation to the plurality of pieces of the intermediate data.

The combined color converting unit may be configured to calculate grid points necessary for color-converting the input data to the output data, color-convert the grid points by interpolating the plurality of color conversion tables stored in the table storage unit, and color-convert the input data based on the color-converted grid points.

The output data creating device may further include an interpolation judging unit that judges whether an interpolation table is to be created. When the interpolation judging unit determines that the interpolation table is to be created, the combined color converting unit may create the interpolating table that meets the output condition obtained by the output condition obtaining unit by interpolation based on the plurality of color conversion tables stored in the table storage unit. Alternatively, when the interpolation judging unit determines that the interpolation table is not to be created, the combined color converting unit may operate to convert the input data into a plurality of pieces of intermediate data based on the plurality of color conversion tables stored in the table storage unit, and create the output data by applying the interpolation to the plurality of pieces of the intermediate data.

The interpolation judging unit may determine whether the interpolation table is to be created or not in accordance with a result of comparison of the number of pixels of the image with a predetermined threshold value.

The output condition may be set in accordance with n (n: an integer) conditional items, and the combined color converting unit may apply an n-th order interpolation to the plurality of color conversion tables stored in the storage unit to create the interpolation table.

The output condition may be set in accordance with n (n: an integer) conditional items, and the combined color converting unit may apply an n-th order interpolation to the plurality of color conversion tables stored in the storage unit to create the interpolation table.

The output condition may be set in accordance with n (n: an integer) conditional items, and the combined color converting unit may apply an n-th order interpolation to the plurality of pieces of the intermediate data to color-convert the input data.

The output condition may include at least one of a temperature of an environment where the image formation device is used, a humidity of an environment where the image formation device is used, a color of the recording medium, material of the recording medium, and a resolution at which the image is formed on the recording medium.

The output data creating device may further include an output condition inputting unit allowing a user to input the output condition. The output condition obtaining unit may obtain the output condition input through the output condition inputting unit.

The image formation device may include a printing device capable of printing the image on the recording medium.

According to aspects of the invention, there is provided a computer program product which includes computer readable instructions that cause a computer to create output data to be used by an image formation device that forms an image on a recording medium based on input data representing image to be formed by the image formation device. Specifically, the instructions cause the computer to function as each of or certain combinations of the device an units described above.

EMBODIMENTS

Referring to the accompanying drawings, illustrative embodiments according to aspects of the invention will be described in detail.

First Embodiment

Figure 2:
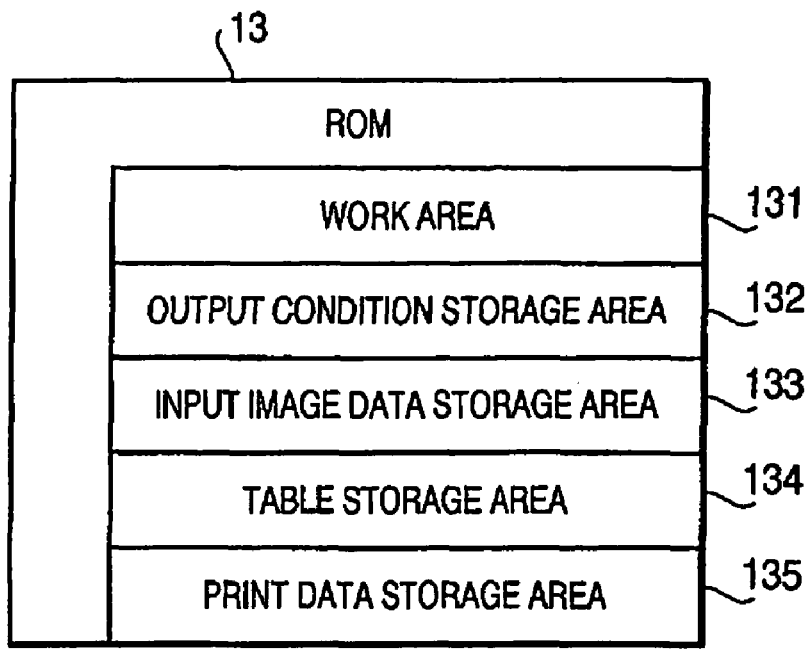
Figure 3:
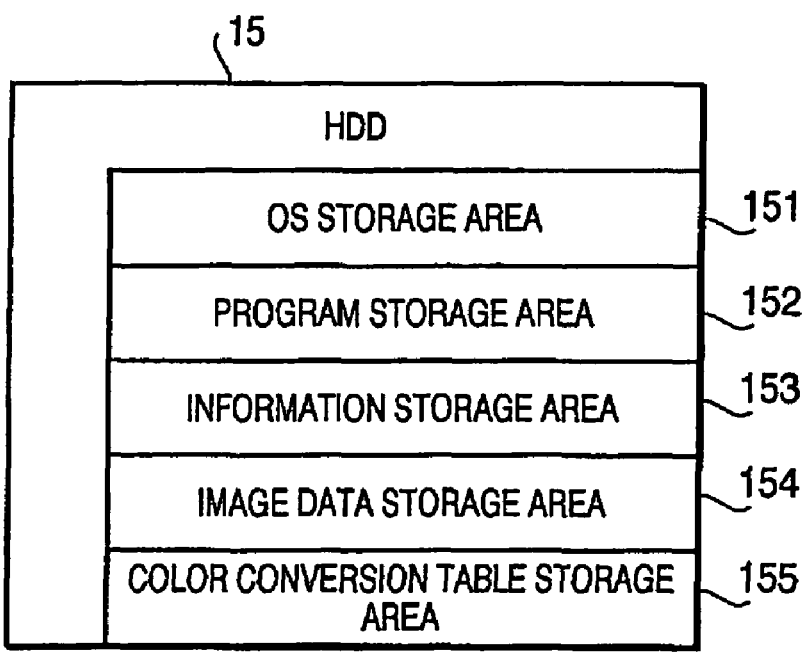

FIG. 1 shows an electrical configuration of a printing system 1 according to aspects of the invention. As shown in FIG. 1, the printing system 1 includes a personal computer (PC) 10 and a printer 20. The PC 10 creates print data based on image data. The printer 20 is an inkjet printer, which printed images on fabric such as a T-shirt based on the print data created by the PC 10. FIG. 2 schematically shows a structure of storage areas of a RAM 13 of the PC 10, and FIG. 3 schematically shows a structure of storage areas of an HDD (Hard Disk Drive) 15 of the PC 10.

As shown in FIG. 1, the PC 10 includes a CPU 11, a ROM 12 storing programs such as BIOS, the RAM 13 which temporarily stores data, a CD-ROM drive 14 that reads/write data on a CD-ROM and the HDD 15 storing various pieces of data, which are interconnected through a bus. Further, the PC 10 includes an interface (I/F) 16 used for data communication with the printer 20, a monitor 17 displaying an operation windows for a user, a keyboard 18 and a mouse 19 through which the user input operational commands and the like, which are connected to the CPU 11 through the bus. Although not shown, well-known floppy drive®, audio input/output unit, various interfaces are also provided to the PC 10.

The CD-ROM to be inserted in the CR-ROM drive 14 stores various programs such as a printer driver including a print data creating program which cause the CPU 11 to execute a print data creating procedure, and various setting parameters and data used to execute programs stored thereon. When the programs are executed, such parameters and data are set up onto program storage area 152 and/or data storage area 153 (see FIG. 3) of the HDD 15 from the CD-ROM.

As shown in FIG. 2, the RAM 13 has various storage areas, which include a work area 131 for storing temporary data during execution of programs, an output condition storage area 132 for storing output condition input by the user, an input image data storage area 133 for temporarily storing image data subjected to be printed, a table storage area 134 for storing color conversion table and interpolation tables used for color conversion of the image data, and a print data storage area 135 for storing print data that is created based on the image data. Although not shown, the RAM 13 includes further storage areas.

As shown in FIG. 3, the HDD 15 includes an OS (operating system) storage area 151 for storing various programs to be executed by the CPU 11, a program storage area 152 for storing applications, printer driver and the like to be executed by the PC 10, a data storage area 153 for storing various pieces of data such as setting parameters and initial values necessary for executing programs, image data storage area 154 for storing a plurality of pieces of image data, and a color conversion table storage area 155 for storing a plurality of color conversion tables. Although not shown in FIG. 3, the HDD 15 includes further storage areas.

When a user instruct to start printing, as described later, the printer driver operates, as will be described later, to execute the print data creating procedure (FIG. 4), and the print data is created based on the image data. The print data is transmitted to the printer 20, which is connected via a communication cable following a communication standard such as the USB. The printer 20 prints images on the T-shirt based on the print data transmitted from the PC 10. It should be noted that the structure of the printer 20 may has a structure of a conventional inkjet printer for fabric. According to the illustrative embodiment, the printer 20 prints an image on the fabric by ejecting four colors of ink (CMYK) from the inkjet heads.

Next, a plurality of color conversion tables stored in the color conversion table storage area 155 of the HDD 15 will be described in detail.

In the printing system 1, in accordance with various conditions (i.e., output conditions) set by the user, optimum print data is created based on the image data. The "output condition" according to aspects of the invention.

Incidentally, the printing system 1 creates optimum print data based on the image data, in accordance with the output conditions set by the user. The "output conditions" may include conditions regarding output resolution, total ink remaining amount and medium (i.e., the color and texture), and the "environment condition" which includes at least one item regarding the printing environment (e.g., the temperature and/or humidity). In the following, the user combines four conditional items: "temperature", "hue of the recording medium", "material of the recording medium" and the "total amount of ink". By combining the four conditional items, the user can set an arbitrary output condition.

In the color conversion table storage area 155 of the HDD 15, a plurality of color conversion tables, which have been created corresponding to combinations of representative values of the conditional items (which values will be referred to as representative conditions), are stored in advance. According to the illustrative embodiment, the representative conditions are as follows.

"temperature": 0° C., 20° C., 40° C.
"hue of medium": 45° (red), 105° (yellow), 165° (green), 225° (cyan), 285° (blue), 345° (magenta)
"material of medium": (10:0), (5:5), (0:10)
"total ink amount restriction value": 20%, 50%, 100%, 200%
where, the "material of medium" represents mixing ratio of cotton to polyester (cotton:polyester), "the total ink amount restriction value" is defined such that the maximum value "255" of 256 steps scale corresponds to 100%, and when four color inks of CMYK are used, the maximum value is 400%. As will be described, by restricting the sum of the scale values of the four colors CMYK to be equal to or lower than the defined "total ink amount restriction value", the ink amount at a unit area can be restricted and a blur of the ink can be prevented. The "hue of the medium" represents values when the hues of the six pieces of fabric (red, yellow, green, cyan, blue, magenta) are measured using a colorimeter, and then calculated using the hue H and the colorimetric values (L*a*b* values) in accordance with the equation below.

$$H = \frac{180}{\pi}\tan^{-1}\left(\frac{a^*}{b^*}\right)$$

where, if H<0, add 360 to H.

Each of the "temperature", "hue of medium", "material of medium" and "total ink amount restriction value" changes continuously or stepwise, and can be represented by a numerical value. The above representative conditions can be represented by numerical values as indicated below, without using respective unit.

"temperature": 0, 20, 40
"hue of medium": 45, 105, 165, 225, 285, 345
"material of medium": 10, 5, 0
"total ink amount restriction value": 20, 50, 100, 200

Then, for each combination of each representative condition, a color conversion table is created in advance. Then, 216 (=3*6*3*4) different combinations of representative conditions exist and thus 216 color conversion tables are prepared in advance, which are stored in the color conversion table storage area 155 of the HDD 15.

Each color conversion table converts sRGB 256-step input data into CMYK 256-step output data, and created by merging an input profile for converting the sRGB to L*a*b*, and output profile for converting the L*a*b* to CMYK. It is noted that sRGB is the international standard for color space defined by IEC (International Electrotechnical Commission), which is employed in many PC peripherals. When the color is adjusted in accordance with the sRGB system, a color difference between the input and output can be suppressed.

The output profile for converting the L*a*b* to CMYK is created such that printing and colorimetric measurement are executed for all the combinations of CMYK to obtain the L*a*b*, and define relationship between the CMYK and L*a*b*. In practice, printing and colorimetric measurement of all the combinations of the CMYK are not performed. Instead, at a plurality of representative combinations, the printing and measurement are executed, and intermediate values are obtained by interpolation. With this operation, CMYK can be converted into L*a*b*. However, what is needed is a conversion table for converting the L*a*b* to CMYK. The output profile for converting the L*a*b* to CMYK is also created using a plurality of representative combinations (representative points). Then, for each of the representative points of the L*a*b*, a combination of CMYK having the closest colorimetric value is related. In the following description, the representative points of the color conversion table will be referred to as grid points.

By merging the output profile with the input profile, sRGB 256-step input and CMYK 256-step output color conversion table can be created. It should be noted that the profile that directly converts the input color space into the output color space is called as a device link profile.

As above, by storing 216 color conversion tables in advance in the color conversion table storage area 155, when the print data is created, the image data can be converted from sRGB 256-step data to CMYK 256-step data based on the color conversion table corresponding to the combination of output items of "temperature", "hue of medium", "material of medium" and "total ink amount restriction value" set by the user.

Next, procedures executed by the PC 10 will be described in detail.

Figure 4:
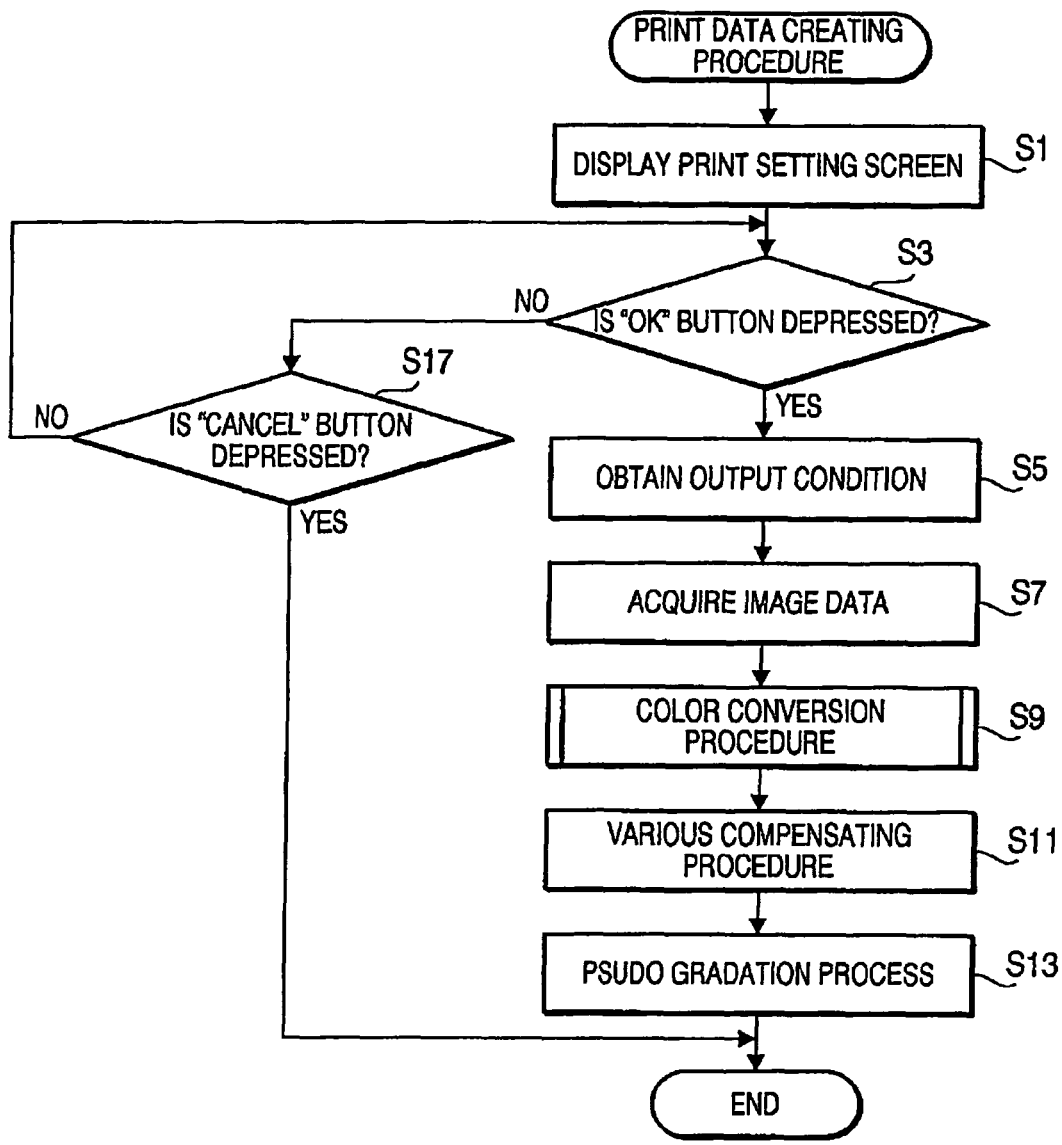
FIG. 4 shows a flowchart illustrating a main procedure of a print data creating procedure according to aspects of the invention.
Figure 5:
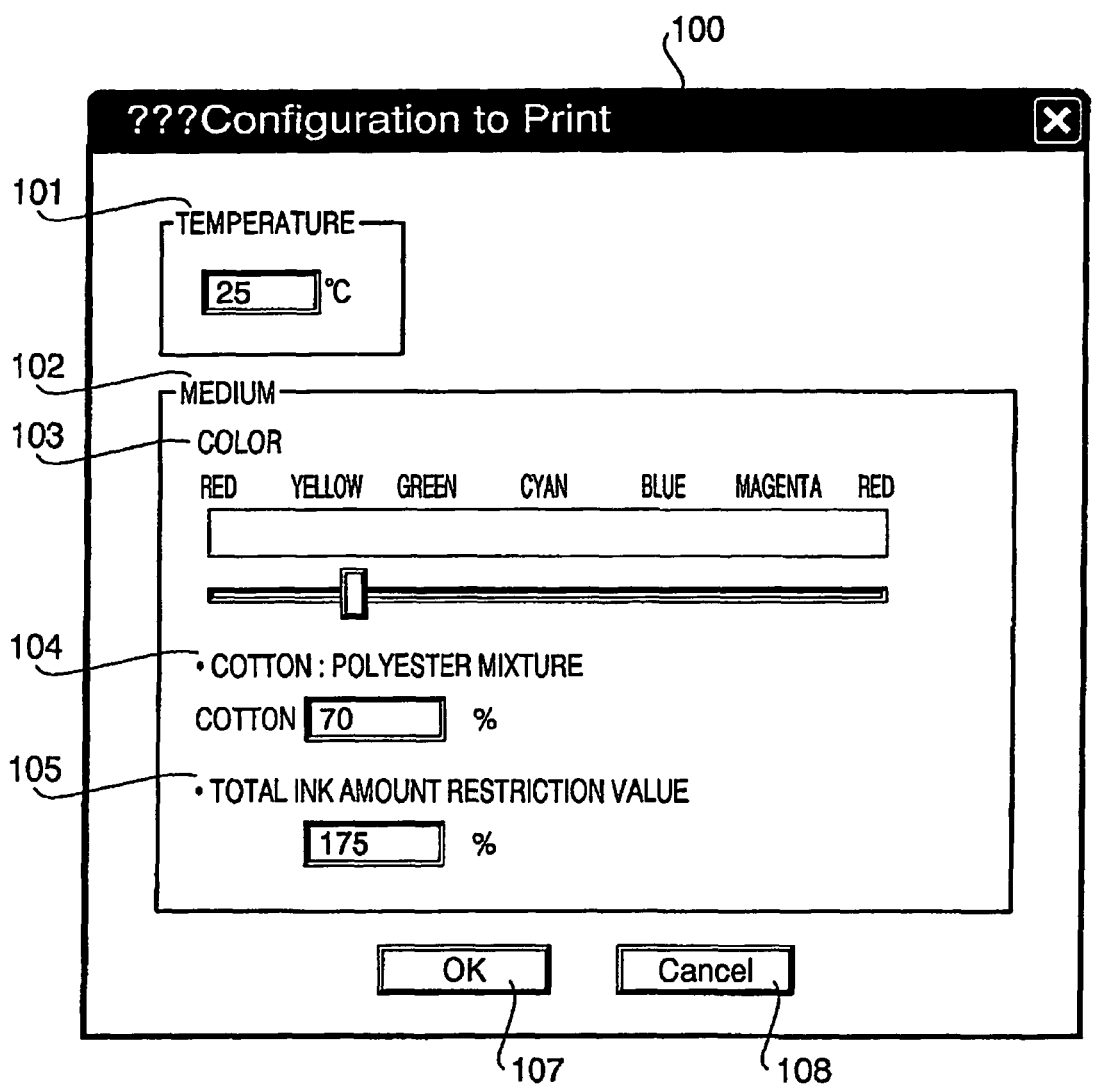
FIG. 5 shows an example of a print setting window according to aspects of the invention.
Figure 6:
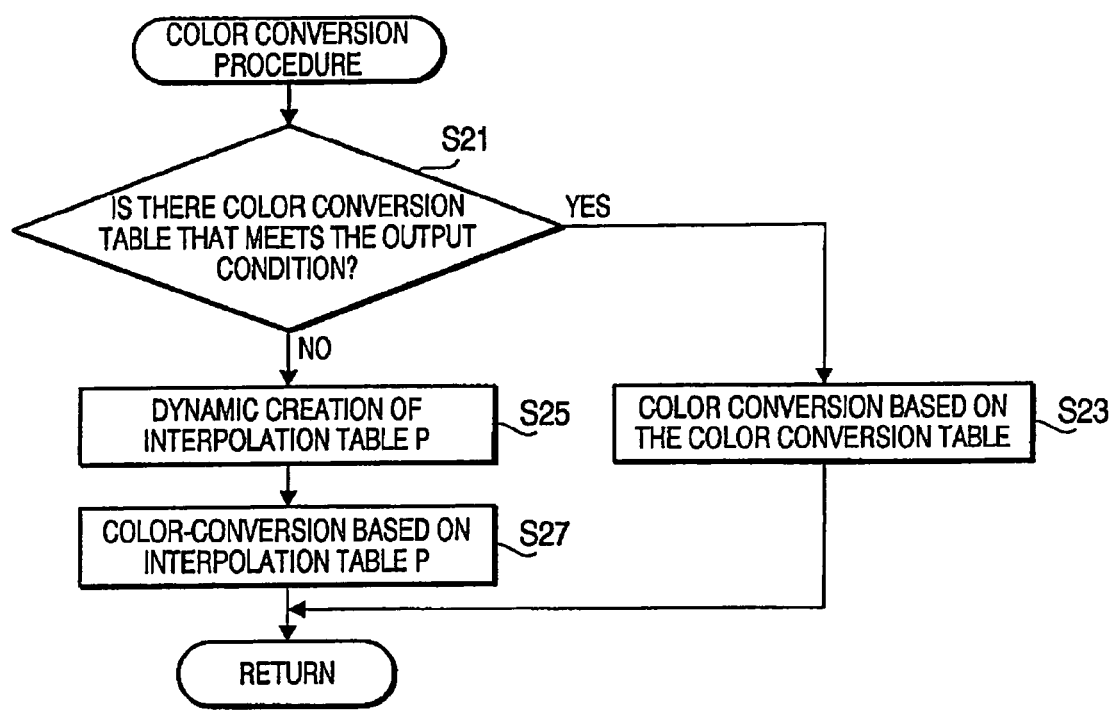
FIG. 6 shows a flowchart illustrating a color converting procedure according to a first illustrative embodiment.

FIG. 4 shows a flowchart illustrating a print data creating procedure that creates print data to be used in the printer 20. FIG. 5 shows an example of a print setting window 100. FIG. 6 shows a flowchart illustrating a color conversion procedure.

In the print data creating procedure (FIG. 4), when the user instructs to start printing using the keyboard 18 or the mouse 19, an application causes the printer driver to start up, and the print data creating procedure is started by the CPU 11 in accordance with the print data crating program included in the printer driver.

As shown in FIG. 4, in the print data creating procedure, the print setting window 100 is displayed on the monitor 17 (S1). As shown in FIG. 5, the print setting window 100 includes a temperature input area 101 for inputting the temperature around the printer 20 when the printing is executed, a media information input area 102 (color box 103, mixing ratio box 104, and total ink amount restricting value box 105). The color box 103 is for inputting the color of the T-shirt, the mixing ratio box 104 is for inputting the mixing ratio of the cotton and polyester which are material of the T-shirt, and the total ink amount restricting value is for adjusting the total amount of the ink such that 100% represents the full amount of ink for each color for normal printing.

Further, the print setting window 100 includes an OK button 107 when the printing is started in accordance with the conditions set in the window 100, and a cancel button 108 for canceling the printing. It should be noted that, an example shown in FIG. 5, user has input 25 in the temperature input area 101, yellow-green in the color box 103, the ratio of cotton: 70% (i.e., polyethylene: 30%) in the mixing ratio box 104, and the total ink amount (e.g., 175%) restricting value is input in the total ink amount restriction value box 105.

When, on the print setting window 100, the user clicks the OK button (S3: YES), the procedure of creating the print data based on the image data input or designated by the user is executed as described below.

First, the output condition set by the user is obtained (S5). In this example, the output conditions set by the user through the print setting window 100 (FIG. 5) are obtained as follows. "temperature": 25° C.; "hue of medium": 130° (yellow-green); "material of medium": 7:3 (cotton: polyester); "total ink amount restriction value": 175%

The above output conditions are practically treated as mere numerical values as indicated below and stored in the output condition storage area 132 of the RAM 13.
"temperature": 25; "hue of medium": 130; "material of medium": 7; "total ink amount restriction value": 175.

Next, the image data subjected to be printed is input (S7). Specifically, in S7, the image data designated by the user from among image data stored in the image data storage area 154 of the HDD 15 is retrieved into the input image data storage area 144 of the RAM 13. It should be noted that the image data retrieved in the input image data storage are 133 may be the data obtained from an external device via an interfaced (not shown), or data input by the user through the keyboard 18 and/or mouse 19. In this illustrative embodiment, the image data input in S3 is sRGB 256-step image data.

In S9, in accordance with the output conditions obtained in S5, a color conversion procedure to color-convert the image data obtained in S7 is executed.

FIG. 6 shows a flowchart illustrating the color conversion procedure. In S21, the process judges whether a color conversion table corresponding to the output conditions obtained in S5 is included in the color conversion table storage area 155 of the HDD 15. If the representative items of the "tempera-ture", "hue of medium", "material of medium" and "total ink amount restriction value" of the output conditions obtained in S5 have the same values of their representative conditions, the output conditions correspond to one of the 216 color tables stored in the color conversion table storage area 155.

When there is a color conversion table corresponding to the output conditions (S21: YES), the color conversion table is retrieved in the table storage area 134, and then the color conversion in accordance with the thus retrieved color conversion table is executed (S23). That is, the image data stored in S7 is converted from sRGB 256-step scale data to the CMYK 156-step scale data.

If there is no color conversion table corresponding to the output conditions (S21: NO), an interpolation table P is dynamically created (S25). That is, in S25, by applying interpolation to a plurality of color conversion tables stored in the color conversion table storage area 155, the interpolated table P which is the profile corresponding to the output conditions obtained in S5 is created. The procedure will be described in detail below.

According to the illustrative embodiment, the output conditions include four conditional items (i.e., "temperature", "hue of medium", "material of medium" and "total ink amount restriction value"). Therefore, when the interpolation is made, each item is represented by an axis and, the interpolation using the four axes will be made. For each conditional item (i.e., each axis), the condition set by the user is defined such that A-th condition and B-th condition are divided into a ratio of a:b (a+b=1) by the condition set by the user.

For example, regarding the axis of the "temperature" (hereinafter, simply referred to as the temperature axis), the value "25° C." set by the user is a value between representative conditions "20° C." and "40° C.". Since the representative condition "20° C." is the second condition and "40° C." is the third condition, A=2 and B=3. Further, the value "25° C." set by the user divides the values 20° C. and 40° C. into 1/4:3/4. Accordingly, a=1/4 and b=3/4. It should be noted that, if the output condition coincides with the representative condition, for example, if the set value is 20° C., it is defined as a value that divides the representative conditions "20° C." and "40° C." into 1:0. With this definition, all the values can be treated in a similar way.

Similarly, for the other conditional items "hue of medium", "material of medium" and "total ink amount restriction value", a "hue of medium" axis, a "material of medium" axis and a "total ink amount restriction value" axis are defined, and for each axis values A, B, a and b are obtained. It should be noted that, in the case of the "temperature", B is always equal to A+1. However, in the case of "hue of medium", B may not be equal to A+1 since when the value exceeds 360°, it returns to 0°. In order to distinguish respective axes from each other, an axis number "j" is introduced as follows. That is, the axis number j of the "temperature axis" is 0, the axis number j of the "hue of medium axis" is 1, the axis number j of the "material of medium axis" is 2 and the axis number j of the "total ink amount restriction value axis" is 3.

Using the above definition of the axis number, the values A, B, a and b for the axes can be represented as $A_j$, $B_j$, $a_j$ and $b_j$. Then, the value set by the user can be represented as follows.
axis 0 ("temperature" axis): A0=2, B0=3, a0=1/4, b0=3/4
axis 1 ("hue of medium" axis): A1=2, B1=3, a1=25/60, b1=35/60
axis 2 ("material of medium" axis): A2=1, B2=2, a2=3/5, b2=2/5
axis 3 ("total ink amount restriction value" axis): A3=3, B3=4, a3=1/4, b3=3/4

Next, based on the values calculated above, necessary ones of the color conversion tables stored in the color conversion storage area 155 are referred to. If the number of axes (i.e., the number of conditional items) is "n", a plurality of color conversion tables P1-Pi (i=$2^n$) corresponding to the combination of the values A0-An, B0-Bn, a0-an and b0-bn will be referred to. In the above example, since the number of axes (i.e., conditional items) is four, the color conversion tables referred to for a linear interpolation correspond to a combination of below indicated 16 (=$2^4$) conditional items. In Table below, sixteen color conversion tables to be referred to sequentially are indicated as P1-P16, respectively.

TABLE

|  |
| --- |
| P1: A0, A1, A2, A3 |
| P2: A0, A1, A2, B3 |
| P3: A0, A1, B2, A3 |
| P4: A0, A1, B2, B3 |
| P5: A0, B1, A2, A3 |
| P6: A0, B1, A2, B3 |
| P7: A0, B1, B2, A3 |
| P8: A0, B1, B2, B3 |
| P9: B0, A1, A2, A3 |
| P10: B0, A1, A2, B3 |
| P11: B0, A1, B2, A3 |
| P12: B0, A1, B2, B3 |
| P13: B0, B1, A2, A3 |
| P14: B0, B1, A2, B3 |
| P15: B0, B1, B2, A3 |
| P16: B0, B1, B2, B3 |

For example, in the color conversion table P13 (B0, B1, A2, A3), the corresponding conditional items are "temperature"=40° C., "hue of medium"=165°, "material of medium"=10:0, and "total ink amount restriction value"=100%. This means that the color conversion table P13 is created corresponding to a combination of the conditional item "temperature" having the representative condition of "40° C.", the conditional item "hue of medium" having the representative condition of "165°", the conditional item "material of medium" having the representative condition of "10:0" and the conditional item "total ink amount restriction value" having the representative condition of "100%".

Then, using the $2^n$ (16 in this illustrative embodiment) color conversion tables P1-Pi, the linear interpolation is performed. The linear interpolation can be done by weight-averaging the $2^n$ color conversion tables. If the weighting is done such that the sum of weighting coefficient is one, simply by adding the weighted values, an average value can be obtained. Since ai+bi=1, the sum of the weighting coefficients is always one. Therefore, provided that the weighting is Wi corresponding to the color conversion table Pi, the linear interpolation is defined such that the weighting corresponds to the condition Ai is bi, and weighting corresponds to the condition Bi is ai. Accordingly, 16 weightings W1-W16 respectively correspond to 16 color conversion tables P1-P16 are expressed as follows.

W1=b0*b1*b2*b3
W2=b0*b1*b2*a3
W3=b0*b1*a2*b3
W4=b0*b1*a2*a3
W5=b0*a1*a2*a3
W6=b0*a1*b2*b3
W7=b0*a1*a2*b3
W8=b0*a1*a2*a3
W9=a0*b1*b2*b3
W10=a0*b1*b2*a3
W11=a0*b1*b2*a3
W12=a0*b1*a2*a3
W13=a0*a1*b2*b3
W14=a0*a1*b2*a3
W15=a0*a1*a2*b3
W16=a0*a1*a2*a3

Then, the necessary color conversion table (interpolated table) P can be obtained with the interpolation in accordance with equation below. That is, the interpolated table P obtained by the equation below is the color conversion table corresponding to the output conditions set by the user (in this illustrative example, "temperature" is 25° C., "hue of medium" is 130° (yellow-green), "material of medium" is 7:3 (cotton:polyester) and "total ink amount restriction value" is 175%.

$$P = \sum_{i=1}^{16} PiWi$$

According to the illustrative embodiment, the interpolation of the conversion table is done such that to all the CMYK values corresponding to the grid points of the sRGB values in the color conversion table, the interpolation is applied in accordance with the output conditions set by the user. In other words, for each of CMYK values on all the grid points, the interpolation using equation (4).

Then, the interpolation table P created in S25 is retrieved in the table storage area 134 of the RAM 13, and based on the interpolation table P, the color conversion is performed (S27). The image data input in S7 is converted from the sRGB 256-step data to CMYK 256-step data. After execution of S23 or S27, the color conversion procedure (FIG. 6) is finished, and the process returns tot print data creating procedure (FIG. 4).

As above, in the color conversion procedure shown in FIG. 6, when there exists the color conversion table corresponding to the output conditions set by the user, the color conversion is executed using the color conversion table. If there are no color conversion tables corresponding to the output conditions set by the user, the process applies the interpolation to the color conversion table (conditional items) so that the interpolation table P corresponding to the output condition set by the user, and by using the interpolation table P, the color conversion of the image data is executed.

For the 256-step CMYK data, to which the color conversion has been executed in S9, various compensating processes are executed (S11). The processes in S11 can be set by the user arbitrarily depending on the purpose and actual devices. For example, when the total ink amount is restricted, the following steps may be executed in S11.

If the sum of the ink amounts of CMYK is greater than the total ink amount restriction value R for all the pixels, the CMYK value is to be reduced so that the sum of the CMYK values is equal to the total ink amount restricting value R. It should be noted that the total ink amount restricting value R is a limit value of the total ink amount per unit area to be used for forming each pixel of the image, and is calculated based on the output condition set by the user. According to the illustrative embodiment, the user has set "175%" as the total ink amount restricting value 105 in the print setting window 100 shown in FIG. 5. This value is obtained as the total ink amount restricting value (Per), and is converted to the total ink amount restricting value R as indicated below.

Total Ink Amount Restricting Value $R$=255*Total Ink Amount Restricting Value (Per)/100

For example, according to the illustrative embodiment, the total ink amount restricting value R is calculated to be 255*1.75=446.25. Digits below the point are rounded and value "466" is obtained as the total ink amount restricting value.

Incidentally, various ways of reducing the CMYK value have been suggested. In the illustrative embodiment, the CMYK value is reduced as follows.

The CMYK values are reduced so that the proportion among the CMYK values before compensation are remained after the compensation. When the compensated values are represented as C'M'Y'K' values, the values are calculated as follows.

When the K value is equal to or greater than the total ink amount restricting value R, $K'=R$, and $C'=M'=Y'=0$.

While, when the K value is less than the total ink amount restricting value R, $K'=K$, $C'=(R-K)*C/(C+M+K)$, $M'=(R-K)*M/(C+M+K)$, and $Y'=(R-K)*Y/(C+M+Y)$ Finally, in S11, the 256-step CMYK data to which various compensating processes have been applied is converted into 2-step CMYK data by a pseudo gradation process (S13). The pseudo gradation process is for reducing the number of steps of the CMYK data from 256-step data to a 2-step data. In the illustrative embodiment, a well-known error diffusion pseudo gradation process is executed. With this operation, the print data for the printer 20 can be created and the print data creating procedure (FIG. 4) is finished. It should be noted that the print data crated in the print data creating procedure (FIG. 4) is stored in the print data storage area 135 of the RAM 13.

When the cancel button 108 is depressed in the print setting window 100 (S3: NO; S17: YES), the print data creating procedure is finished. If neither of OK button 107 nor cancel button 108 is depressed (S3: NO; S17: NO), the process returns to S3, where the process waits for depression of the OK button 107 or the cancel button 108.

After the print data creating procedure (FIG. 4) is executed, at a predetermined timing, the print data stored in the print data storage area 135 of the RAM 13 is transmitted to the printer 20 through the I/O 16. Then, in the printer 20, a program for printing is executed by a CPU (not shown), the print data is accumulated in a print buffer (not shown), and then, based on the print data, an image is printed on the T-shirt.

With the printing system 1 according to the first illustrative embodiment, if there are no color conversion tables corresponding to the output conditions set by the user in PC 10, based on the preliminarily stored plurality of color conversion tables, the image data is color-converted, and then based on the converted image data, the print data is created. Therefore, based on the image data, the print data exactly reflecting the output conditions can be created, without requiring data storage capacity of the color conversion tables to be increased.

Specifically, by applying interpolation to the preliminarily stored plurality of color conversion tables with respect to the conditional items, the interpolation table P, which is the color conversion table corresponding to the output conditions, is created, and based on the interpolation table P, the image data is color-converted. Therefore, even if the color conversion table exactly corresponds to the output conditions, and if the number of conditional items included in the output conditions is relatively large, the optimum color conversion can be performed.

Further, the plurality of (n) conditional items include at least one of the temperature, humidity, total amount of the ink, color and/or material of the recording medium, and resolution. The user is allowed to input/modify the output conditions through the print setting window 100 using the keyboard 18 and mouse 19. Therefore, the user can arbitrarily set various printing conditions and environmental conditions as the output conditions.

Second Embodiment

Figure 7:
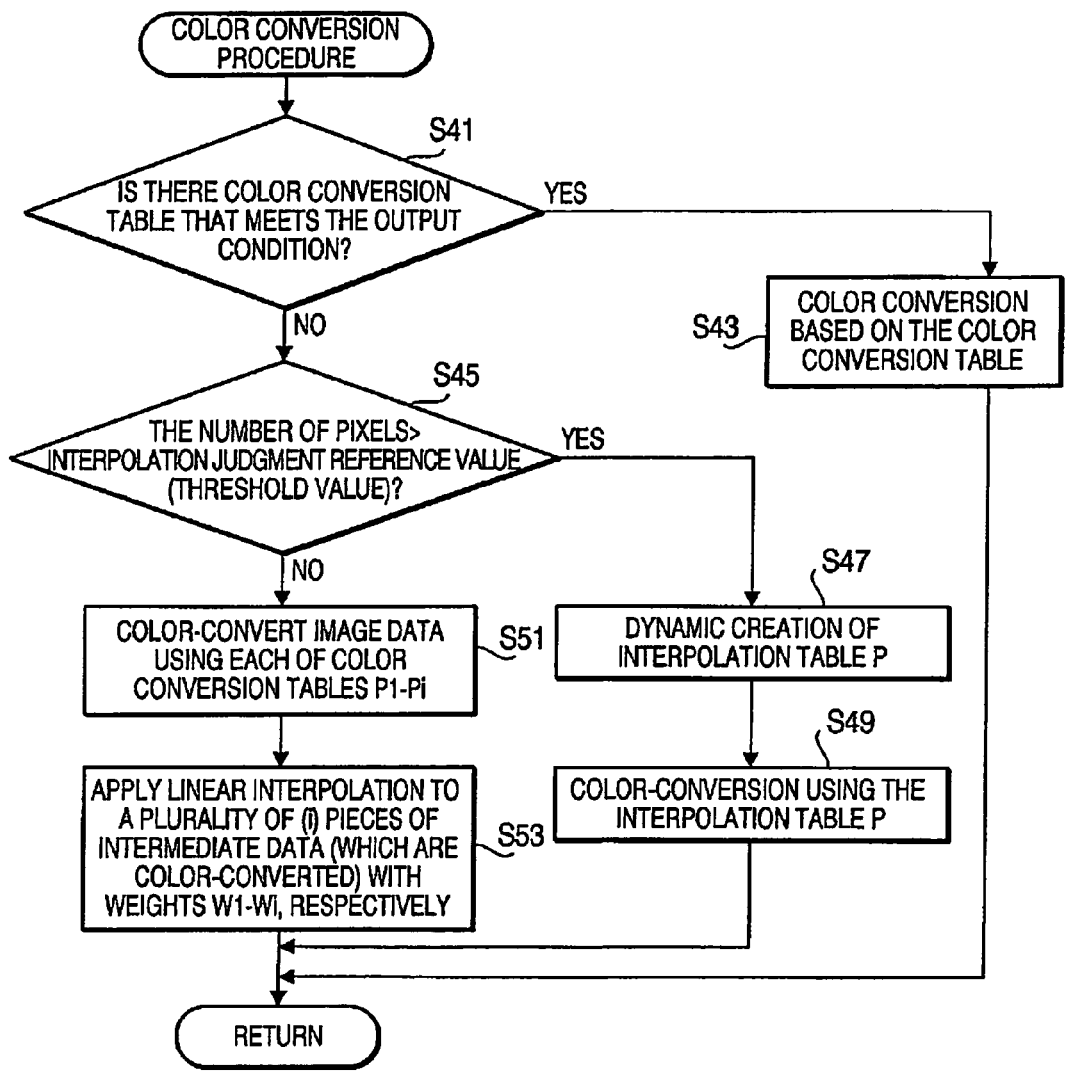
FIG. 7 shows a flowchart illustrating a color converting procedure according to a second illustrative embodiment.

Next, the printing system 1 according to the second illustrative embodiment will be described. The printing system 1 according to the second embodiment is substantially the same as the printing system 1 according to the first embodiment. The difference therebetween is the color converting procedure (FIG. 4: S9). FIG. 7 shows a flowchart illustrating the color converting procedure according to the second embodiment.

As shown in FIG. 7, in the color converting procedure according to the second embodiment, similar to S21 and 23 of FIG. 6, the process judges whether there exists a color conversion table corresponding to the output condition (S41). If there exists a color conversion table corresponding to the output conditions (S41: YES), the process executes the color conversion based on the color conversion table (S43).

If there are no color conversion tables corresponding to the output conditions (S41: NO), the process judges whether the number of pixels of the image data input in S7 is greater than a predetermined threshold value (S45). By use of the predetermined threshold value, based on the number of the pixels included in the image data, the color conversion method is differentiated. It should be noted that the predetermined threshold value may be set by the user arbitrarily, but according to the illustrative embodiment, value "1,000", which has been determined by the applicant during experiments.

If the number of the pixels is greater than the predetermined threshold value (S45: YES), the dynamic creation of the interpolation table (S47) and the color conversion (S49) using the interpolation table are executed. As a result, the interpolation process is executed and the interpolation table P is generated, and the color conversion is executed using the thus created interpolation table P to create 256-step CMYK data.

If the number of the pixels of the image data is equal to or less than the predetermined threshold value (S45: NO), the image data input in S7 is color-converted using the color conversion tables P1-Pi, respectively (S51). That is, in S51, similar to the dynamic creation of the interpolation table in the first embodiment (S25), a plurality of color conversion tables P1-Pi (i=2") are referred to. Then, based on each of the color conversion tables P1-Pi, the image data input in S7 is color-converted and a plurality of pieces of intermediate data. Specifically, in this illustrative embodiment, the number of the condition items is four. Therefore, based on the plurality of color conversion tables P1-P16, which is indicated by equation (2), the image data is color-converted in sixteen different ways, and sixteen pieces of intermediate data are created.

Then, the linear interpolation is applied to the thus created i pieces of intermediate data created in S51 with the weighting of W1 though Wi (S53). That is, in S53, similar to the dynamic creation of the interpolation table (S25), the weighting W1-Wi respectively corresponding to the plurality of color conversion tables are obtained. Then, the linear interpolation is applied to the plurality of (i) pieces of the intermediate data color-converted in $2^n$ ways with the weighting of W1-Wi. According to the illustrative embodiment, interpolation is performed as indicated in equation (4) with respect to a plurality of pieces of intermediate data color-converted in 16 ways with the weighting of W1-W16 indicated by equation (3). As a result, the interpolation is applied to a plurality of pieces of intermediate data based on the plurality of color conversion tables P1-Pi, and 256-step CMYK data, which has been color-converted in accordance with the output conditions set by the user is created.

After execution of S43, S49 and S53, the color conversion procedure (FIG. 7) is finished, and the process returns to the print data creating procedure (FIG. 4). As above, in the color conversion procedure (S9) shown in FIG. 7, when the number of pixels are relatively large, similar to the first embodiment, the color conversion using the interpolation table P.

If the number of pixels is small, a plurality of pieces of intermediate data color-converted using the color conversion tables P1-Pi, respectively, and the interpolation is applied to the plurality of pieces of intermediate data in terms of the conditional items, thereby the image data being color-converted.

As described above, with the printing system 1 according to the second embodiment, when no color conversion table corresponding to the output conditions exists and the interpolation table P is created, the image data is color-converted using the interpolation table P. While, if the interpolation table P is not created, the image data is converted to a plurality of pieces of intermediate data using a plurality of color conversion tables, respectively, and the interpolation is applied to the plurality of pieces of intermediate data. Therefore, in either case, based on the image data, the print data exactly reflecting the output conditions. In this case, it is not necessary to increase the capacity of the storage for the color conversion tables.

Further, whether the interpolation table P is created or not is determined by comparing the number of pixels of the image data with the predetermined threshold value. Therefore, the color conversion of the image data can be performed quickly in accordance with the optimum method depending on the number of pixels.

In the second embodiment, the image data is converted into a plurality of pieces of intermediate data. Then, the interpolation is done with respect to the plurality of pieces of intermediate data to achieve the color-conversion of the image data. Therefore, even if the color conversion table corresponding to the output conditions does not exit, or the number of conditional items constituting the output conditions is relatively large, the optimum color conversion corresponding to the output conditions can be performed.

Third Embodiment

Figure 8:
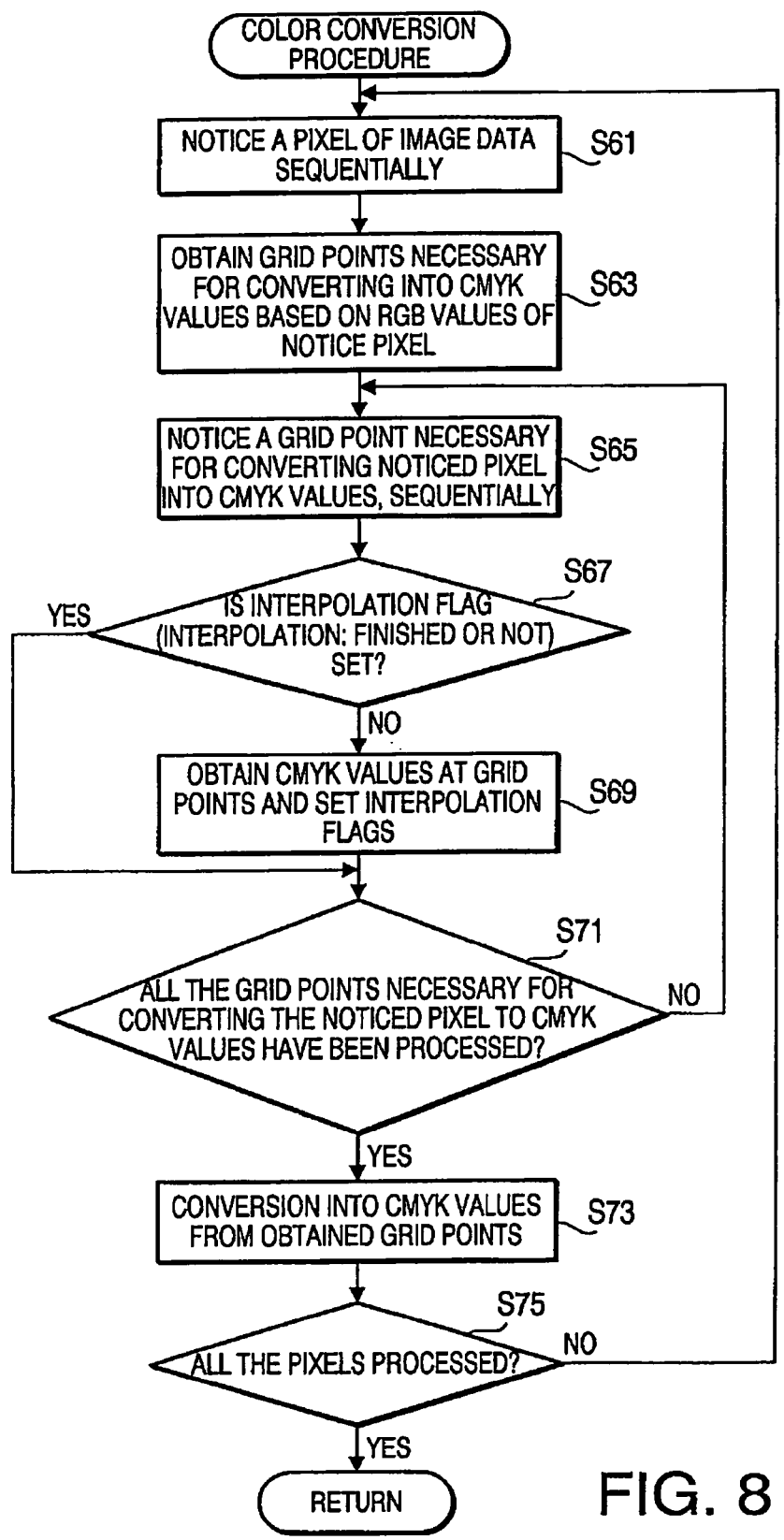
FIG. 8 shows a flowchart illustrating a color converting procedure according to a third illustrative embodiment.

The printing system 1 according to the third embodiment will be described. The printing system 1 is similar to that of the first embodiment except that the color conversion procedure is different. FIG. 8 shows a flowchart illustrating the color conversion procedure according to the third embodiment.

When the color conversion procedure (FIG. 8) is started, the process determines a notice pixel (S61), which is one of a pixel of the image data. Then, the based on the RGB values of the notice pixel, the process determines grid points necessary for converting the notice pixel into the CMYK values (S63). In S63, at most eight gird points are obtained. Then, at the grid points obtained in S63, one of the grid points necessary for converting the notice pixel to the CMYK values is noticed (S65), and the process judges whether the interpolation flag is set (S67). The interpolation flag is provided in the predetermined storage area of the RAM 13 for each of the grid points, and represents whether the CMYK values have been calculated by interpolation.

If interpolation flag is not set (S67: NO), the process obtains the CMYK values at the notice grid point by interpolation and sets the interpolation flag corresponding to the notice grid point (S69). In S69, by applying the interpolating to a plurality of color conversion tables stored in the color conversion table storage area 155 of the HDD 15, the CMYK values at the grid point are obtained. If the interpolation flag has been set (S67: YES) or after execution of S69, the process judges whether all the grid points necessary for converting the notice pixel to the CMYK values have been processed (S71). If there remains an unprocessed grid point (S71: NO), the process returns to S65 and repeats S67-S71 until all the interpolation flags corresponding to the grid points necessary for converting the notice pixel to the CMYK values are set.

If there are no unprocessed grid points (S71: YES), which means that all the grid points for the notice pixel have been processed, in accordance with the grid points, the RGB values of the notice pixel into the CMYK values (S73). Then, the process judges whether the above process has been finished for all the pixels (S75). If there remains an unprocessed pixel (S75: NO), the process returns to S61, and repeats S63-S75 until all the pixels are processed. When all the pixel are processed (S75: YES), all the pixels of the image data have been converted into CMYK values, and thus, the color conversion procedure is finished.

As described above, in the color conversion procedure shown in FIG. 8, for each pixel of the image data, grid points necessary for color-converting the pixel area obtained and the CMYK values for each grid point are calculated by interpolation. Then, based on the CMYK values of each grid point, the RGB values of the pixel area converted into the CMYK values, thereby the image data is color-converted.

According to the third illustrative embodiment, for each pixel of the input image data, CMYK values of the grid points necessary for converting the RGB values of the notice pixel to the CMYK values are calculated, and by interpolating the CMYK values of the grid points, the image data is color-converted. Therefore, the color conversion tables only for the grid points necessary for color-converting the image data are created, it is not necessary to created the entire interpolation table P as in the first embodiment. With this configuration, the processing speed is increased, while the storage capacity is not increased unnecessarily.

It should be noted that that present invention is not limited to the above-described illustrative embodiments, but can be modified in various ways according to aspects of the invention. For example, in the above-described embodiments, the printer 20 is described to print images on the T-shirt (fabric). It is noted that the invention can be applied to a printer which prints images on a recording sheet, label and the like.

Among the output conditions input by the user, for some conditional items, interpolating may be disabled. That is, if the output conditions include "temperature", "humidity", "type of medium", and the "type of medium" includes glossy paper and normal paper, the interpolation may be done for the "temperature" and "humidity", but the interpolation may not be done for the "type of medium". In such a case, for numerical operation (calculation), tentative numbers or characters are assigned to the "type of medium". That is, the type of medium may be represented by "medium (A)" and "medium (B)", for example. Then, if the user designates the glossy paper, the process may regard that the "medium (A)" and "medium (B)" are divided to 1:0.

The image data to be input need not be limited to the sRGB data, but the data of any other type data such as the CMYK data or HSV data of another color space may be used. Similarly, the print data to be output need not be limited to the CMYK data, but can be data of other color spaces such as RGB data, HSV data or the like depending on the data type employed in the printer. Further, in the above-described embodiments, the printer uses CMYK data with four colors of ink. The number of colors of ink need not be limited to four but can be five or more. If three-dimensional data such as the RGB data or CMY data is output, it becomes necessary to convert such data into four-dimension data (CMYK data). In such a case, a color conversion such as a UCR method may be applicable.

In the above-described embodiments, a case where the print data to be used by the inkjet printer 20 is described. It is of course possible to apply the invention when a printer other recording type. For example, when the print data for a laser beam printer that uses toner, it is possible to create optimum print data by applying the color conversion to the image data in accordance with the output conditions. Further, the invention is applicable not only when the print data is created, but the output data to be used by a display device.

In the above-described embodiments, as the color conversion tables, a device link profile for converting the sRGB data to CMYK data is indicated as an example. The color conversion table needs not be limited to the above, but various alternatives can be used. For example, the input profile may not be of the ICC profile type but any other type profile can be used. Further, not the device link profile but only the output profile is created and interpolation may be applied to the output profile to create the interpolation table. Specifically, in the color conversion procedure shown in FIG. 6, the output profile is obtained by interpolating (S25), and converts the same to L*a*b* values using the input profile (S27). Then, thus obtained image data is converted to the CMYK using the output profile.

It should be stressed that the various values, elements, components and devices described above are only examples, and optimum ones should be used depending to the color space of the data, types of the ink, types of the recording medium and further conditions. Further, the output conditions set by the user need not be limited to the four conditions ("temperature", "hue of medium", "type of medium" and "total ink amount restriction value") described above. The environmental conditions such as humidity and brightness, printing conditions such as resolution and printing speed, and other conditional items may be optionally or alternatively included.

In the above-described embodiment, the user sets the output conditions based on the four conditional items, and thus, by four-dimensional interpolation, the optimum print data is created. The number of the conditional items may be n (n being three or less, or five or more). In such a case, n-dimensional interpolation, the optimum print data can be created. Further, in the above-described embodiment, the user designates the output condition though the print setting window 100. However, if sensors detecting the "temperature" and "humidity" are provided to the PC 10, the detected values may be automatically input.

What is claimed is:

1. An output data creating device that creates output data to be used by an image formation device that forms an image on a recording medium based on input data representing image to be formed by the image formation device, the data creating device comprising:
   an output condition obtaining unit configured to obtain an output condition, which is information regarding a temperature of an environment where the image formation device is used or a material of the recording medium used by the image formation device and includes setting values for each of n (n being an integer greater than one) conditional items;
   a table storage unit configured to store a plurality of color conversion tables, each of the plurality of color conversion tables corresponding to a combination of representative values for the respective n conditional items used for converting the input data to the output data;
   a combined color converting unit configured to convert the input data based on the output condition and the plurality of color conversion tables stored in the table storage unit; and
   an output data creating unit that creates the output data based on the input data having been color-converted by the combined color converting unit,
   wherein the combined color converting unit creates an interpolating table that meets the output condition obtained by the output condition obtaining unit by interpolation based on the plurality of color conversion tables that store the same type of information and respectively correspond to $2^n$ combinations of representative values which consist of two closest representative values to the setting value for each of n conditional items included in the obtained output condition stored in the table storage unit and converts the input data based on the interpolation table in response to a determination that there is no color conversion table that meets the output condition obtained by the output condition obtaining unit in the table storage unit.

2. The output data creating device according to claim 1, wherein the combined color converting unit is configured to:
   convert the input data into $2^n$ pieces of intermediate data based on the plurality of color conversion tables respectively corresponding to the $2^n$ combinations stored in the table storage unit; and
   create the output data by applying the n-th order interpolation to the $2^n$ pieces of the intermediate data.

3. The output data creating device according to claim 1, wherein the combined color converting unit is configured to:
   calculate grid points necessary for color-converting the input data to the output data;
   color-convert the grid points by applying the n-th order interpolation to the plurality of color conversion tables respectively corresponding to the $2^n$ combinations stored in the table storage unit; and
   color-convert the input data based on the color-converted grid points.

4. The output data creating device according to claim 1, further comprising an interpolation judging unit that judges whether the interpolation table is to be created,
   wherein, when the interpolation judging unit determines that the interpolation table is to be created, the combined color converting unit creates the interpolating table that meets the output condition obtained by the output condition obtaining unit by applying the n-th order interpolation based on the plurality of color conversion tables respectively corresponding to the $2^n$ combinations stored in the table storage unit, and wherein, when the interpolation judging unit determines that the interpolation table is not to be created, the combined color converting unit operates to:

convert the input data into a plurality of pieces of intermediate data based on the plurality of color conversion tables respectively corresponding to the $2^n$ combinations stored in the table storage unit; and create the output data by applying the n-th order interpolation to the plurality of pieces of the intermediate data.

5. The output data creating device according to claim 4, wherein the interpolation judging unit determines whether the interpolation table is to be created or not in accordance with a result of comparison of the number of pixels of the image with a predetermined threshold value.

6. The output data creating device according to claim 1, wherein the conditional items includes at least one of a temperature of an environment where the image formation device is used, a humidity of an environment where the image formation device is used, a color of the recording medium, material of the recording medium, and a resolution at which the image is formed on the recording medium.

7. The output data creating device according to claim 1, further comprising an output condition inputting unit allowing a user to input the output condition, wherein the output condition obtaining unit obtains the output condition input through the output condition inputting unit.

8. The output data creating device according to claim 1, wherein the image formation device includes a printing device capable of printing the image on the recording medium.

9. A non-transitory computer-readable medium storing a computer program that includes computer readable instructions that cause a computer to create output data to be used by an image formation device that forms an image on a recording medium based on input data representing image to be formed by the image formation device, the instructions causing the computer to function as:

an output condition obtaining unit configured to obtain an output condition, which is information regarding a temperature of an environment where the image formation device is used or a material of the recording medium used by the image formation device and includes setting values for each of n (n being an integer greater than one) conditional items;

a table storage unit configured to store a plurality of color conversion tables, each of the plurality of color conversion tables corresponding to a combination of representative values for the respective n conditional items used for converting the input data to the output data;

a combined color converting unit configured to convert the input data based on the output condition and a plurality of color conversion tables stored in the table storage unit; and an output data creating unit that creates the output data based on the input data having been color-converted by the combined color converting unit, wherein the combined color converting unit creates an interpolating table that meets the output condition obtained by the output condition obtaining unit by interpolation based on the plurality of color conversion tables that store the same type of information and respectively correspond to $2^n$ combinations of representative values which consist of two closest representative values to the setting value for each of n conditional items included in the obtained output condition stored in the table storage unit and converts the input data based on the interpolation table in response to a determination that there is no color conversion table that meets the output condition obtained by the output condition obtaining unit in the table storage unit.

10. The non-transitory computer readable medium according to claim 9, wherein the combined color converting unit is configured to:

convert the input data into $2^n$ pieces of intermediate data based on the plurality of color conversion tables respectively corresponding to the $2^n$ combinations stored in the table storage unit; and create the output data by applying the n-th order interpolation to the $2^n$ pieces of the intermediate data.

11. The non-transitory computer readable medium according to claim 9, wherein the combined color converting unit is configured to:

calculate grid points necessary for color-converting the input data to the output data;

color-convert the grid points by applying the n-th order interpolation to the plurality of color conversion tables respectively corresponding to the $2^n$ combinations stored in the table storage unit; and color-convert the input data based on the color-converted grid points.

12. The non-transitory computer readable medium according to claim 9, wherein the instructions further cause the computer to function as an interpolation judging unit that judges whether the interpolation table is to be created, wherein, when the interpolation judging unit determines that the interpolation table is to be created, the combined color converting unit creates the interpolating table that meets the output condition obtained by the output condition obtaining unit by applying the n-th order interpolation based on the plurality of color conversion tables respectively corresponding to the $2^n$ combinations stored in the table storage unit, and wherein, when the interpolation judging unit determines that the interpolation table is not to be created, the combined color converting unit operates to:

convert the input data into a plurality of pieces of intermediate data based on the plurality of color conversion tables respectively corresponding to the $2^n$ combinations stored in the table storage unit; and create the output data by applying the n-th order interpolation to the plurality of pieces of the intermediate data.

13. The non-transitory computer readable medium according to claim 12, wherein the interpolation judging unit determines whether the interpolation table is to be created or not in accordance with a result of comparison of the number of pixels of the image with a predetermined threshold value.

14. The non-transitory computer readable medium according to claim 9, wherein the conditional items include at least one of a temperature of an environment where the image formation device is used, a humidity of an environment where the image formation device is used, a color of the recording medium, material of the recording medium, and a resolution at which the image is formed on the recording medium.

15. The non-transitory computer readable medium according to claim 9,
wherein the instructions further cause the computer to function as an output condition inputting unit allowing a user to input the output condition,
wherein the output condition obtaining unit obtains the output condition input through the output condition inputting unit.

16. The non-transitory computer readable medium according to claim 9,
wherein the image formation device includes a printing device capable of printing the image on the recording medium.

* * * * *